US007037193B1

(12) United States Patent
Kasparov et al.

(10) Patent No.: US 7,037,193 B1
(45) Date of Patent: May 2, 2006

(54) METHOD FOR PLAYING A LOTTERY GAME AND SYSTEM FOR REALIZING THE SAME

(75) Inventors: Garri Kimovich Kasparov, Moscow (RU); Valery Filippovich Ivanov, Moscow (RU)

(73) Assignee: Obschestvo S Ogranichennoi Otvetstvennostiju "Mezhdunarodnye Igrovye Sistemy", Moscow (RU)

( * ) Notice: Subject to any disclaimer, the term of this patent is extended or adjusted under 35 U.S.C. 154(b) by 0 days.

(21) Appl. No.: 09/786,336

(22) PCT Filed: Sep. 8, 1998

(86) PCT No.: PCT/RU98/00281

§ 371 (c)(1), (2), (4) Date: Jun. 13, 2001

(87) PCT Pub. No.: WO00/13757

PCT Pub. Date: Mar. 16, 2000

(51) Int. Cl.
*A63F 13/00* (2006.01)

(52) U.S. Cl. ........................... 463/17; 463/18; 463/19; 463/40; 463/41; 463/42; 463/43

(58) Field of Classification Search ............ 463/16–20, 463/39–43, 1; 273/269
See application file for complete search history.

(56) References Cited

U.S. PATENT DOCUMENTS

| | | | | |
|---|---|---|---|---|
| 4,494,197 | A | | 1/1985 | Troy et al. |
| 4,592,546 | A | * | 6/1986 | Fascenda et al. ............. 463/29 |
| 4,651,995 | A | * | 3/1987 | Henkel ........................ 273/237 |
| RE32,480 | E | * | 8/1987 | Bolan .......................... 463/19 |
| 4,768,151 | A | * | 8/1988 | Birenbaum et al. ........... 463/19 |
| 4,813,676 | A | * | 3/1989 | Weatherspoon ......... 273/144 A |
| 4,875,164 | A | | 10/1989 | Monfort |
| 5,073,931 | A | | 12/1991 | Audebert et al. |
| 5,117,358 | A | * | 5/1992 | Winkler ...................... 708/135 |
| 5,257,179 | A | | 10/1993 | DeMar |
| 5,326,104 | A | * | 7/1994 | Pease et al. .................. 463/18 |
| 5,526,035 | A | * | 6/1996 | Lappington et al. ........ 725/136 |
| 5,722,890 | A | * | 3/1998 | Libby et al. .................. 463/17 |
| 5,936,661 | A | * | 8/1999 | Trew .......................... 725/114 |
| 6,173,955 | B1 | * | 1/2001 | Perrie et al. ................ 273/146 |
| 6,287,199 | B1 | * | 9/2001 | McKeown et al. ........... 463/40 |
| 6,354,941 | B1 | * | 3/2002 | Miller et al. .................. 463/19 |

FOREIGN PATENT DOCUMENTS

| | | |
|---|---|---|
| EP | 0 180 676 | 5/1986 |
| EP | 0 194 395 | 9/1986 |
| EP | 0426163 | 5/1991 |
| EP | 0 450 520 | 10/1991 |

(Continued)

*Primary Examiner*—Xuan M. Thai
*Assistant Examiner*—Ross Williams
(74) *Attorney, Agent, or Firm*—Oblon, Spivak, McClelland, Maier & Neustradt, P.C.

(57) ABSTRACT

The present invention relates to a method for playing a lottery game and for a sports-game totaliser. According to this method, each player (3) participating e.g. in a lottery uses an individual memory device (4) that comprises at least a timer (27), a memory (26), an information input-output device (29) as well as an indicator (31) defining a game area (89) corresponding to that found on lottery tickets of the "bingo" or "national lottery" type. This system is further characterised in that, when counting the time for recording hypothetical information into the individual memory device (4), it uses both the digital data from the timer (27) and the time characteristics thereof. The individual memory device (4) is further capable of recording simultaneously several variants of hypothetical information and of formatting the same using a predetermined algorithm.

4 Claims, 7 Drawing Sheets

FOREIGN PATENT DOCUMENTS

| | | | |
|---|---|---|---|
| GB | 2180460 | * | 4/1987 |
| RU | 2105586 | | 2/1998 |
| WO | WO 97/01145 | | 1/1997 |
| WO | WO 97/12338 | | 4/1997 |
| WO | WO 97/20275 | | 6/1997 |
| WO | WO 00/13757 | * | 3/2000 |

* cited by examiner

METHOD FOR PLAYING A LOTTERY GAME AND SYSTEM FOR REALIZING THE SAME

FIELD OF INVENTION

The invention relates to arranging for, and holding the game events, in particular, methods and systems for organising lotteries and sport totalisers.

DISCUSSION OF THE BACKGROUND

One of the most widely used methods for holding lotteries consists in distribution of special numbered tickets bearing an information data set applied thereon, their drawing according to a random rule in a predetermined time, and determining and awarding a pecuniary or valuable prize. This method has many varieties. Thus, for example, Bingo lottery that is one of the most world-popular lotteries is held in a hall in front of a large screen or at homes in front of TV's; participants of this game acquire the digit-bearing lottery tickets beforehand; numbers are drawn using a lototron; a participant who is the first to have filled one of the ticket lines is awarded a premium for the line; after the line has been announced, Bingo prize is drawn, and its winner will be the first participant who announced that all digits on his/her ticket (5 lines) had corresponded to the previously drawn numbers. Similar rules are established for Rousskoye Lotto lottery. However, the known systems (international application WO 97/01145, U.S. Pat. No. 4,875,164, U.S. Pat. No. 5,257,179, application for European patent EP 0 450 520 A, and other) designed to arrange for various games wherein participants use individual electronic memory devices, do not allow their owners to participate in such lotteries. The reason is that all information display means provided in these individual devices do not replace the tickets with respect to said procedure of their filling in the course of a game.

Another drawback of the known systems that use individual memory devices is a complexity of the techniques used therein in terms of synchronisation of time T(i) of recording, in the individual memory devices, of the information relating to i-th event and the time for holding such event. Thus, U.S. Pat. No. 5,073,931 describes a system, according to which, for ascertaining participation of a player in an event, a relative temporal span is to be measured in an individual memory device proper and in a central server separately for each i-th event. This results in a complication of individual memory devices, a lower accuracy of computations due to, for example, a long deviation of frequency of quartz resonators, used therein, from their rated value. Further, such method of measuring T(i) requires that a data collection center will be provided with a server system for measuring relative temporal spans related to i-th event. In case of the direct computation of T(i), errors of operation of a timer provided in an individual memory device are accommodated only by limitation of the time period for its presentation for obtaining a win. This circumstance significantly reduces the system application field due to the inconvenience of the established maximal period for presenting an individual memory device and due to actually complete exclusion of the possibility to elicit a winner in accordance with the criterion of swiftness of recording the relevant information by him/her.

In respect of the set of essential features, the most pertinent prior art (a prototype) of the claimed invention are a method and system for holding lotteries described in international application WO 97/20275. The distinguishing feature of this invention consists in that in case of necessity the need of a central server and any communication means can be obviated both in time of holding events and in time of obtaining a win. The reason is that for holding an event, it is sufficient to store only the absolute time of i-th event (absolute time of i-th events can be stored simply on a magnetic carrier of a video tape recorder by which these events are recorded) and data of a timer in an individual memory device, according to which data the recording time T(i) is computed after said time has been reported to a system data collection center. That is, both in the course of an event and after the same has ended, any computation operations involving measurement of a relative time elapsed after the event has finished can be excluded completely. Further, the computation operations are excluded not only in a central server proper (if any), but in an individual memory device as well. However, a drawback of this system is also a lowering of an accuracy of determining T(i) due to a long instability of quartz resonator parameters and impossibility of application of this system for holding the Bingo-type 2-lotteries.

A common drawback of all known systems that use individual memory devices is inconvenience of formation of hypothetical information therein. This relates, in particular, to methods for formation of a number of variants of data relating to one event or event in such event.

As regards the sports contests (soccer, basketball, hockey, etc.), these may be different variants of penalty kick/throw result, and for lotteries—variants of number combinations to be drawn by lototron. This is, obviously, the reason of a limited use of the known systems designed for holding sport totalisers with the use of individual memory devices.

Absence of any source of true information should be also considered as the common drawbacks of the known systems for holding lotteries, wherein a simple automatic mechanical lototron is used. The reason is the absence of mechanical lototrones operated in an automatic mode and having a simple reliable design. Thus, in the lototron described in application DE 4307800 C1, automatic picking up of balls from the mixing drum requires that said drum be filled, completely or partially, with a liquid and further a special collection chamber or a suction pump be used.

Other drawbacks of the known systems will be considered below. In light of the foregoing, the object of the invention is to eliminate the above-discussed drawbacks.

DISCLOSURE OF THE INVENTION

The object of the invention is to provide a method for arranging for various events related to holding lotteries or sport totalisers, the practical realisation of which method will not require: first, the use of different special tickets used in Bingo and Russian Lotto types of lottery; second, any individual memory devices wherein any measurements and computations for determining the time of recording an information would be done.

The essence of the way to attain the invention object is that. the game participants use individual memory devices, each of which has a timer, internal memory and information input/output means; they store, in the internal memory, the time data supplied from the timer at the moment when the participants are given an information to be stored in the internal memory after formation on an indicator that has a game area similar to that of the tickets for participation in lotteries of the Bingo and Russian Lotto.

Further, said method is devised to determine the time when information is recorded into an internal memory of individual memory device by computing the algebraic sum between the current time of information reading from the internal memory and production of the timer temporal parameters and the difference of its data stored in the memory and present at output of an individual memory device at the moment when they are read. For implementing this method for calculating the time when information is recorded into the internal memory of an individual memory device in a system data collection center: a temporal characteristics measuring means connected to an information processing means is used. Further, during use of this system for holding a lottery, a special mechanical lototron can be used as a source of true information.

An advantage of the considered method for holding lotteries and a system for realising the same is that the necessity to use cards, coupons and similar means in any game event is obviated. Another advantage of the invention is a complete independence of the game participants from the communication means through which the hypothetical information is transmitted to a data collection center.

Other features and advantages of the invention will be more obvious from the following detailed description and claims 2–23.

BRIEF DESCRIPTION OF DRAWINGS

The invention is further explained by description of particular, but not limiting, embodiments thereof and the accompanying drawing, wherein.

PREFERABLE EMBODIMENTS OF THE INVENTION

In description of the considered embodiment of the claimed method for holding lotteries as illustrated in the accompanying drawings, a particular specific terms are used for better clarity. However, the invention is not limited by the terms used herein, and it will be appreciated that each such term embraces all equivalent members operating in a similar manner and used to resolve the same problems that include arrangements for organising a totaliser, in particular a sport totaliser, as well as other events involving prediction of events. It is also noted that hereinafter the notion of user means a participant or a group of participants who in the course of a lottery game, totaliser betting, or in some education process have one individual memory device.

Figure 1:
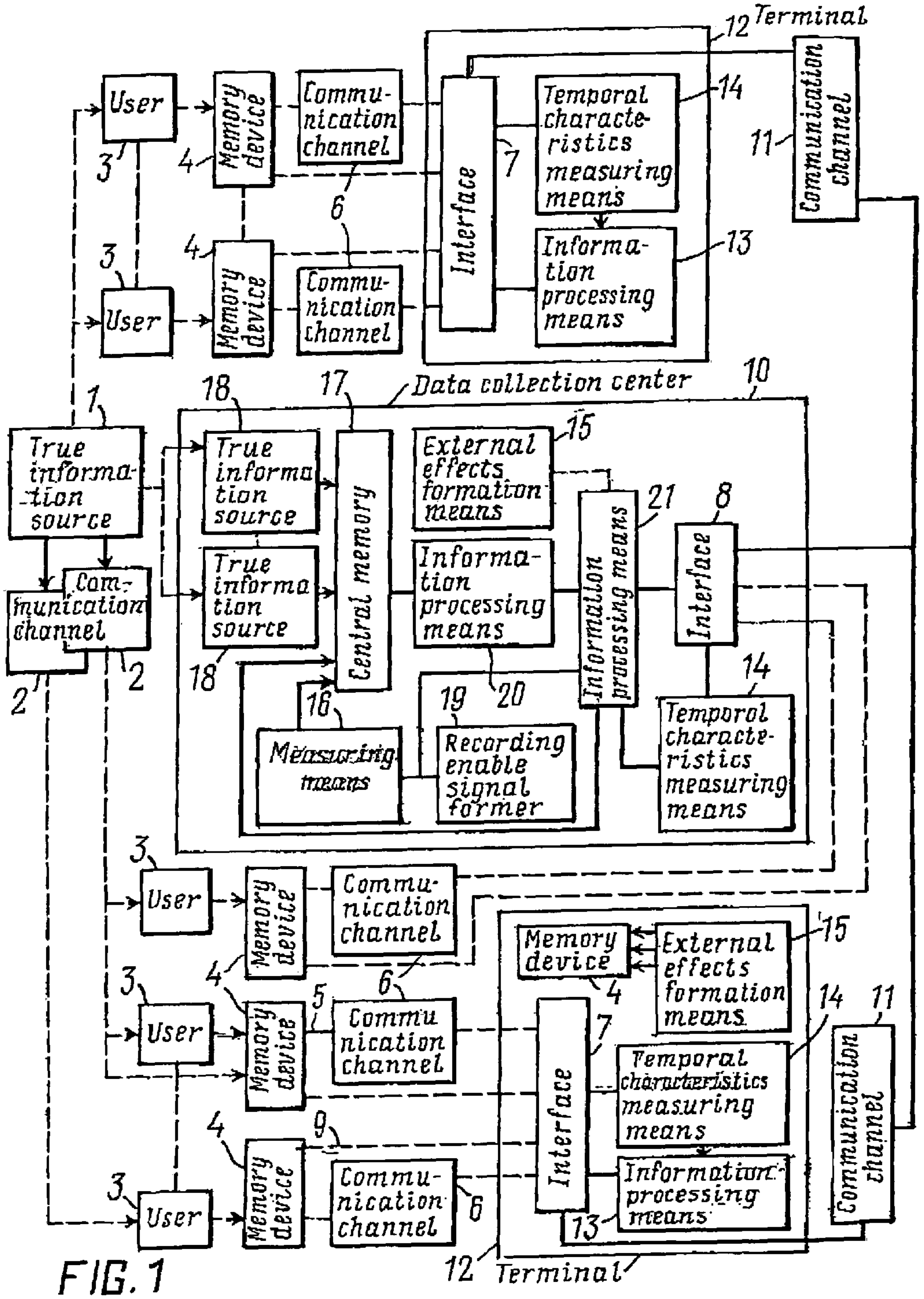
FIG. 1 illustrates a general diagram of a system for holding lotteries and sport totalisers.

In FIG. 1, numeral 1 designates a true information source being a plurality of operations or events; outcome of i-th event or operation being defined at t(i) moment. Moments of beginning and end of i-th event or operation will be designated as $t1(i)$ and $t2(i)$, respectively. An event may mean such events as holding of a lottery using a lototron, chess tournament, chess game, soccer match that can be broadcast via communication channels 2, for example, via television or radio broadcasting communication channels.

Any term of communication channel here and hereinafter means a set of technical means and physical media intended to transmit information (signals) from a sender to a recipient (user). Main technical means comprised by a communication channel are: true information sensors, transmitters, receivers, signal amplifiers, encoders and decoders, modulators and demodulators, switches, filters, interfaces, etc. Technical means and a physical medium that provide propagation of signals from a transmitter to a receiver together constitute a communication link. A transmission medium can be a composite one and include segments of various types, e.g. wire links, optical fiber links, in which case an appropriate converter should be provided for therebetween. In a transmitter, a message (information) from true information source 1 is converted into digital or analogue signals that afterwards are delivered to communication link input; at output of a communication link, a receiver reproduces the transmitted message according to the received signal. Depending on the nature of signals, the communication links are differentiated according to the following types: electrical communication links (wire and radio communication), sound (acoustic) communication link and light communication links (optical communication).

Displayed true information can be transmitted to user (participant) 3 directly from true information source 1, or via display devices comprised by communication channels 2. Display devices are the devices for visual and acoustic (television sets) or only acoustic (radio receivers) displaying of true information. The presence of a plurality of communication channels 2 is explained by the possibility to transmit information from true information source 1 through a number of television and radio broadcasting channels. Each user 3 has a possibility of recording, at moment T(i), the information hypothetically assumed by him/her into memory device 4, which device, for the purpose to emphasise that itself is not one of many functional elements but implemented in the form of a finished portable construction, will be designated as PorMD (portable memory device). The other name of PorMD used herein is a loter. This name is protected in Russia by Trademark Certificate N 149561 of Jan. 31, 1997, and the name of loter is protected by Trademark Certificate N 49562 of Jan. 31, 1997.

One of the main conditions that an hypothetical information will be accepted for lottery drawing is satisfaction of the following inequalities:

$$T(i)<t(i)-b,\ T(i)<t1(i)-b,\ T(i)<t2(i)-b,\ T(i)<T(0),$$

where b>o, T(0) is the maximum period for submitting a loter to a data collection center; T(i) is the time for recording the hypothetical information as computed according to the loter data. Further, T(i)=T(i)+Y, where Y is computation error.

Selection of this or another inequality, and values of b coefficient is governed by the rules established by event organisers.

Dashed lines 5 denote the connections which, after a game event has ended, are used for connecting PorMD 4 via communication channels 6 to interfaces (input/out interfaces) 7, 8, in capacity of which interfaces computers can be used. Dashed lines 9 denote the connections used to connect PorMD 4 to interfaces 7, 8 directly, i.e. without any communication channels. Connection of PorMD 4 to interfaces 7, 8 is done to compare the true information stored at data collection center 110 with the hypothetical information stored in PorMD 4. Data collection center 10 communicates with interfaces 7 via communication channels 11. Apart from interface 7, terminals (servers) 12—each of which is a subscriber (user) location intended for processing and outputting the information comparison results supplied thereto from PorMD 4 and data collection center 10—can comprise information processing means 13, temporal characteristics measuring means 14, and external effects formation means 15.

Information processing means 13 is intended for reading (and processing, if necessary) the information delivered from PorMD. Information processing means 13 can comprise computers, printers, automatic tellers, communication link adapters, etc. Data collection center 10 comprises time t(i) precision measuring means 16, whose one of the inputs can be coupled to a precise time signal former, and one of its outputs can be coupled to central memory (CM) 17 at whose input, in its turn, arrives a signal from one, or more true information sensors 18. Further, output of time measuring means 16 can be coupled to recording enable signal former 19.

It will be appreciated that, in the simplest version, terminal 12 performs only reading of information from PorMD and its transmission to data collection center 10. The required data stored in CM 17 can be, using information pre-processing means 17, sent to input of information processing means 21, which means can be a computer. It is noted that means 14 and 15 can be provided inside data collection center 10.

All members comprised by the described system are known or standard ones. Thus functions of true information sensors 18, CM 17 and time measuring means 16 can be simultaneously performed by a camcorder, and functions of information pre-processing means 16 can be performed by an operator. Examples of standard implementation of other members are cited in the text. Further, as was noted above, true information sensor 18 and recording enable former 19 can be a constituent of one or more communication links 2.

Figure 2:
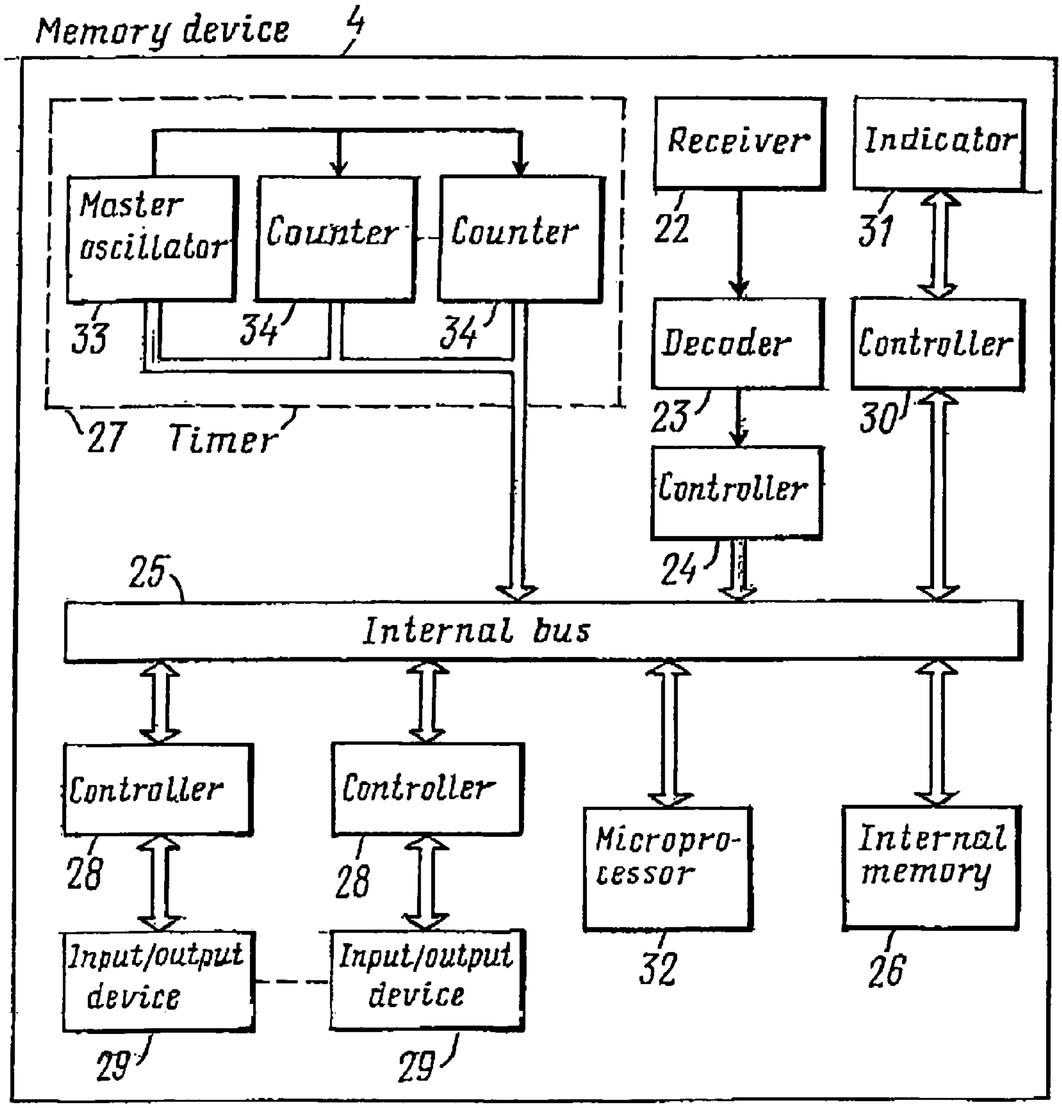
FIG. 2 illustrates a functional diagram of a portable memory device.

FIG. 2 shows a functional diagram of a loter. Functional circuitry of PorMD 4 is implemented on the basis of a functional circuit of a standard or specialised microcomputer. The number of portable memory devices 4 cannot be less than the number of users participating in a lottery or sport totaliser. But the major member of a PorMD is signal receiver 22 connected to decoder 23, which decoder, via controller 24 and internal bus 25, is connected to internal memory 25 that includes a random-access memory and read-only memory. Internal memory 26, in turn, is connected, via internal bus 25 to one, or more independent timers 27. Internal memory 26 is connected, via controller 28, to one or more information input/output devices 29, and, via controller 30, to indicator 31 that can be a LCD. Interaction of all members with internal memory 26 is implemented using a control unit, that can be microprocessor 32. Power supply for all members comprised by PorMD 4 is provided from an internal source. One of the variants of implementation of timer 33 can consist of master oscillator 33 mounted together with a frequency divider, which oscillator generates pulses having period of 0.01–1 s. Said pulses are supplied to input of one more counters 34 that use a predetermined recalculation coefficient. From outputs of said counters, the time data, when user 3 makes recording, are sent to input of memory 26 via common bus 25 or a data bus (in case a PorMD has a different design). The counters are coordinated with all mentioned members by internal adapters.

In the simplest case, counter 34 can include a plurality of connected in-series counters, and timer 27 can comprise auxiliary members (a switching means, decrypters, central control unit, etc.). In another embodiment of a PorMD, counters 34 can be formed by software.

All members cited herein can be implemented basing on the known circuits, or standard units (single-chip microcomputers, clock LSI circuits, etc.) of communication systems and computers applications can be used a such members. Further, PorMD can comprise ancillary units intended, in particular, for measuring the external effects (external radiation, mechanical acceleration). In the simplest embodiment, PorMD's can be PIC-type microcontrollers consuming small amounts of current. All PIC's have their internal ROM's and RAM's. Further, PIC's are provided with timers (1 to 3 units), in-board-reset system, watchdog timers, in-board clock that can be triggered by a quartz resonator.

It is noted that also are known such versions of PorMD that can be used in this system in their practically unchanged form. Thus, one of such PorMD's is described in European patent EP 0426163 A1. In more sophisticated embodiments of implementation of PorMD, additional independent microcomputers for additional auxiliary functions, such as input of information into PorMD by user's voice, reception and processing of information provided from data collection center 10, outputting of variants of hypothetical information etc., can be used. Other embodiments of PorMD can be dedicated ones, for example intended only for participation in chess totalisers. Among the PorMD constructional members the following means can be cited: liquid-crystal display, alpha-numeric or only numeric keypad, non-fixed button switches and functional keypad, wherein by pressing each of the keys a corresponding instruction is inputted, so that code of an appropriate event is entered.

Among other constructional features of implementation of PorMD, the following ones can be mentioned: implementation of PorMD in the form of two portions—a card including at least a memory (or a portion thereof) 26, timer 27, control unit 32 and means comprising at least members 30, 31, 29, 28, 32, 26. Cards store an amount of money or number of the won points, and also information recorded in the course of a game and data of timer 27, being specific tokens for a play now held, the results being recorded in the same card. A number of types of said cards having various cost can be used, which cards can have different values of their points or a different number of the initial points. These cards are based on the same technology as chip-based credit cards and have the highest security level, wins being paid at locations 10, 12 upon submitting a card thereat. Checking of a card and payment of minor wins can be effected directly from the user's place via communication channels 6.

Figure 3:
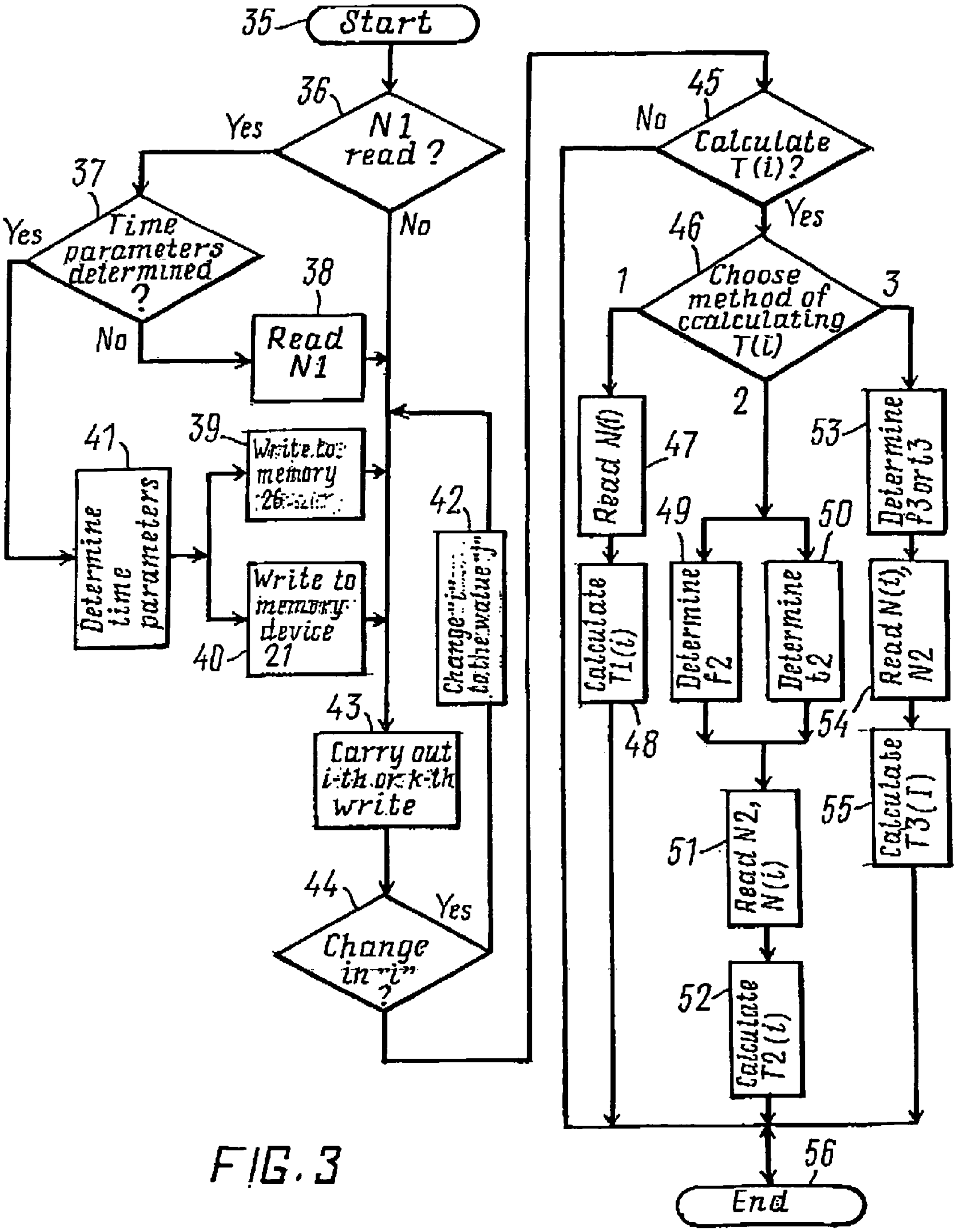
FIG. 3 illustrates a flow chart of a recording time computation algorithm.

FIG. 3 shows a flow chart of an algorithm used for computing the recording time. Numerals that are not designated in said Fig. are as follows.

Item 36 indicates the condition of N1 is being read?;

item 37 indicates the condition of Temporal parameters are being determined?;

item 38 denotes the step of reading of N1;

item 39 denotes the step of Recording into memory 26;

item 40 denotes the step of recording into memory of means 21;

item 41 denotes the step of Determination of temporal parameters; item 42 denotes the step of Changing i by value of j;

item 43 denotes the step of Recording of i-th or k-th recording;
item 44 denotes the condition of Whether i will be changed?;
item 45 denotes the condition of T(i) is being computed?;
item 46 denotes the condition of Selection of a method for computing T(i);
item 47 denotes the step of Reading of N(i);
item 48 denotes the step of Computation of T1(*i*);
item 49 denotes the step of Determination of f2;
item 50 denotes the step of Determination of t2;
item 51 denotes the step of Reading N2, N(i);
item 52 denotes the step of Computation of T2(*i*);
item 53 denotes the step of Determination of f3 or t3;
item 54 denotes the step of Reading N(i) N2;
item 55 denotes the step of Computation of T3(*i*).

Figure 4:
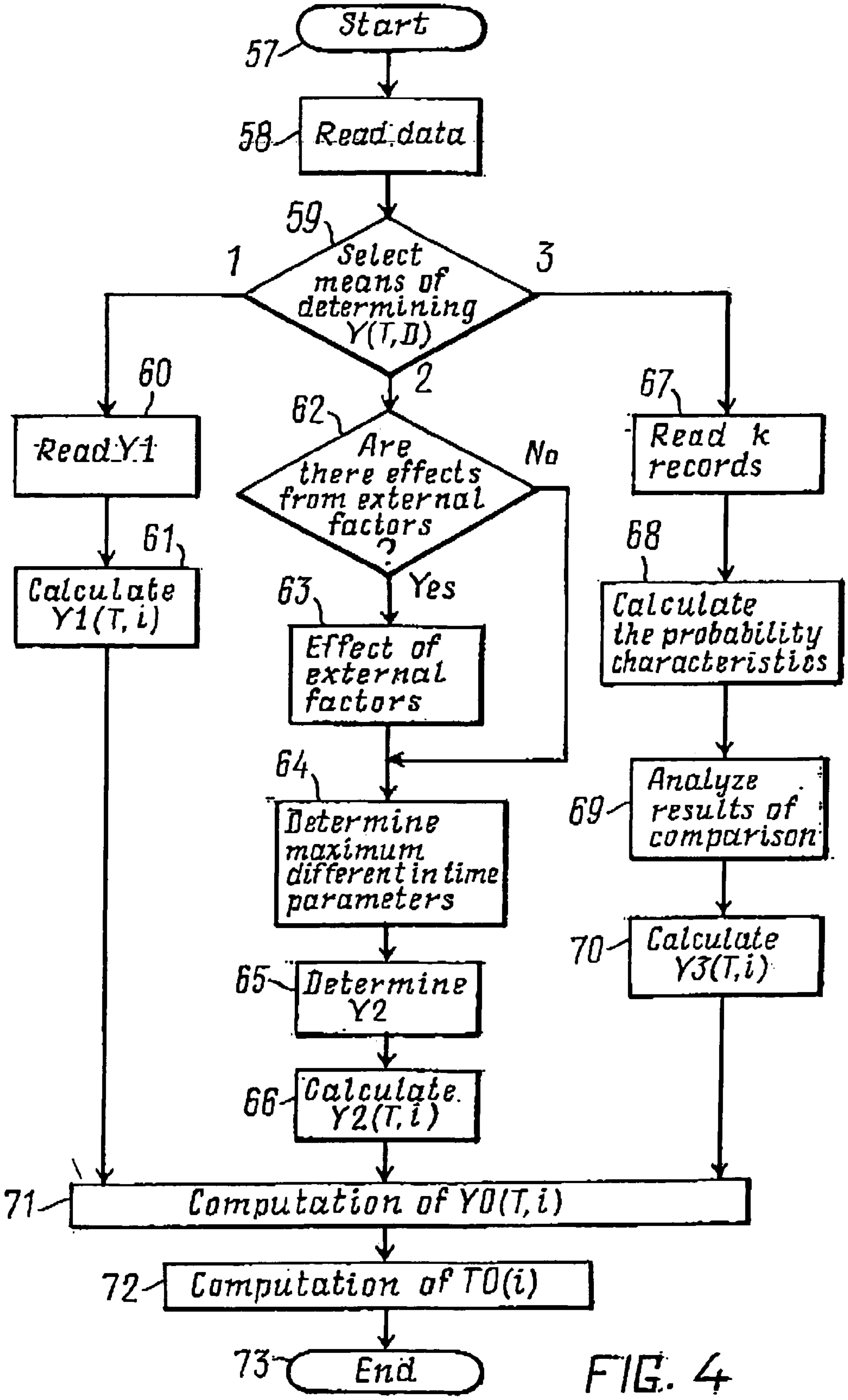
FIG. 4 illustrates a flow chart of an algorithm for determining a recording error.

FIG. 4 shows a flow chart of an algorithm for determining a recording error. Numerals that are not designated in said Fig. are as follows.

Item 58 denotes the step of Reading the data;
item 59 indicates the condition of Selection a method for determining Y(T,i);
item 60 denotes the step of Reading Y1;
item 61 denotes the step of Computation of Y1(T,i);
item 62 indicates the condition of Whether there will an effect produced by external factors?;
item 63 denotes the step of Effects produced by external factors;
item 64 denotes the step of Determination of the maximal difference of temporal parameters;
item 65 denotes the step of Determination of Y2;
item 66 denotes the step of Computation of Y2(T,t);
item 67 denotes the step of Reading of k-recordings;
item 68 denotes the step of Computation of probability characteristics;
item 69 denotes the step of Analysis of the comparison results;
item 70 denotes the step of Computation of Y3(T,i).

Figure 5:
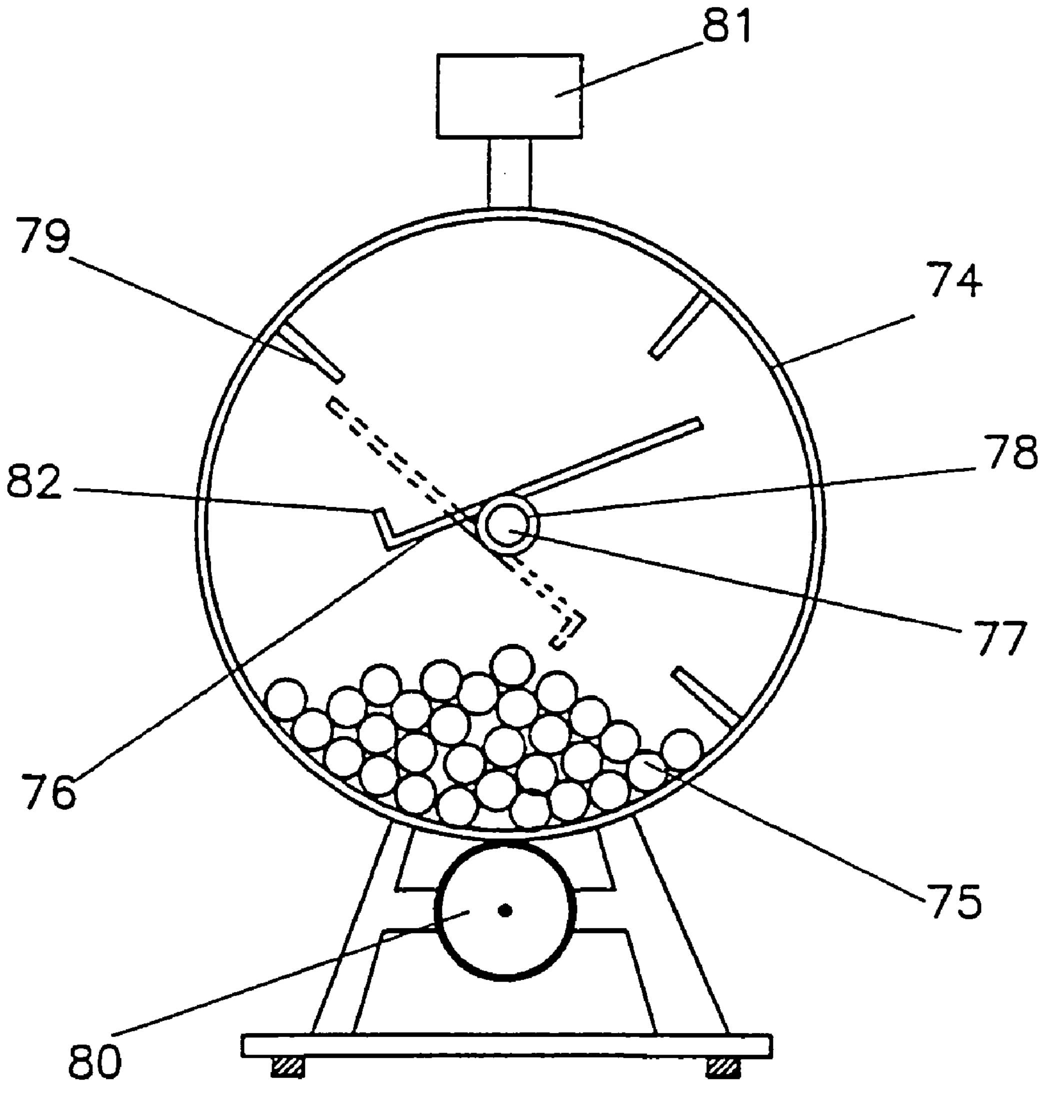
FIG. 5 illustrates a general view of a true information source.

FIG. 5 illustrates a general view of a lototron used in the described system as the true information source. The lototron comprises mixing drum 74 containing balls 75 and a ball pickup device. The latter consists of guide 76 fitted on axle 77 that in turn is supported by two slider or roller bearings 78 attached on two sides of the drum 74 lateral surfaces. Guide 76 has the form of a narrow plate or rod. If the distance between two lateral walls of drum 74 exceeds double diameter of ball 75, then guide 74 must have its own lateral walls (not shown). For more efficient mixing of the balls inside the drum, small grips 79 are mounted, though, as practical operation has demonstrated, their presence is not mandatory. Drum 74 is rotated by drive 80. Further, axle 77 can be coupled also to another drive (not shown in FIG. 5), or to a mechanism of its connection to drive 80. Over drum 74, installed is indicator 81 for indicating a drawing number and also another information relating to lottery holding. For the purpose to keep the picked-up balls, stopper 82 is provided on one of the guide 76 ends. In case such stopper is not provided, the guide must have a concave shape. A control circuit for the lototron and indicator is an autonomous or common one for the entire system described herein. In the latter case, one or two drives, and also indicator 81 are controlled from data collection center 10 or from terminal 12.

Figure 6:
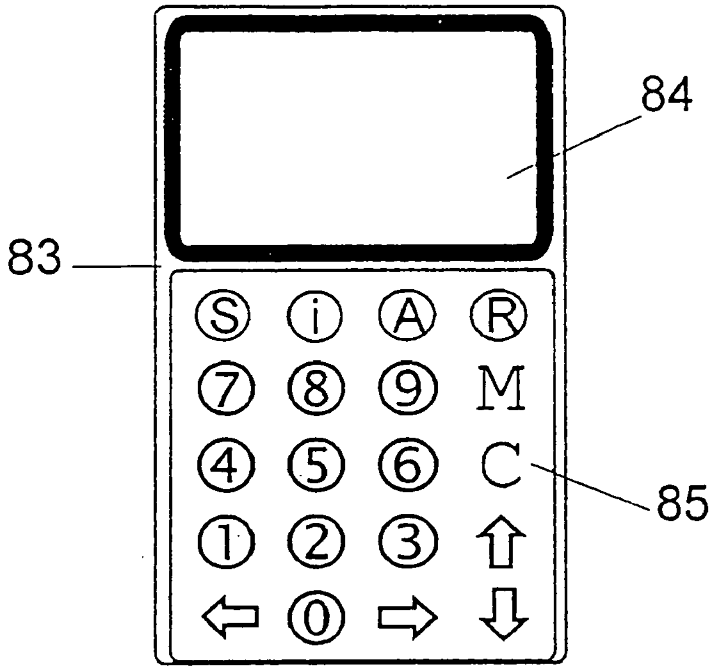
FIG. 6 illustrates exterior of a universal portable memory device.

FIG. 6 shows a general view of an embodiment of universal PorMD that on its face panel 83 has panel 84 of liquid crystal display indicator 31 and alpha-numeric keypad 85 in the form of non-fixed button switches.

Figure 7:
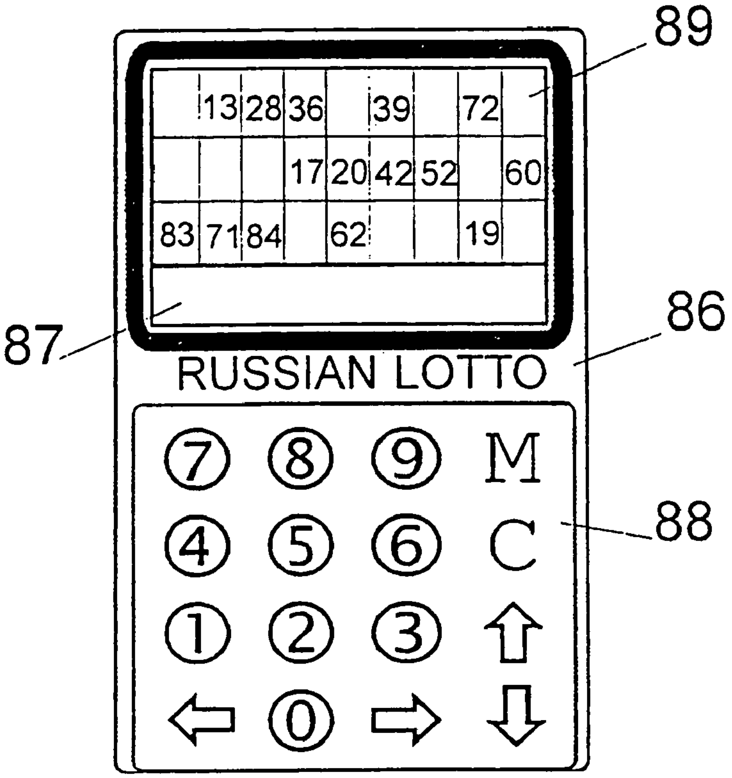
FIG. 7 illustrates exterior of a specialised portable memory device.

FIG. 7 shows a general view of an embodiment of a specialised PorMD designed for holding Russian Lotto lottery. Face panel 86 of this PorMD has panel 87 of a liquid crystal display and alphanumeric keypad 88 in the form of button switches. A universal loter is distinguished in that the upper portion of panel 87 of the liquid crystal display has lines applied thereon and forming the game area 89 for Russian Lotto lottery, or a similar game, for example—Bingo lottery. But it is noted that these lines can be created by software means as well, for example in case of use of a graphic or specialised LCD as indicator 31.

Figure 8:
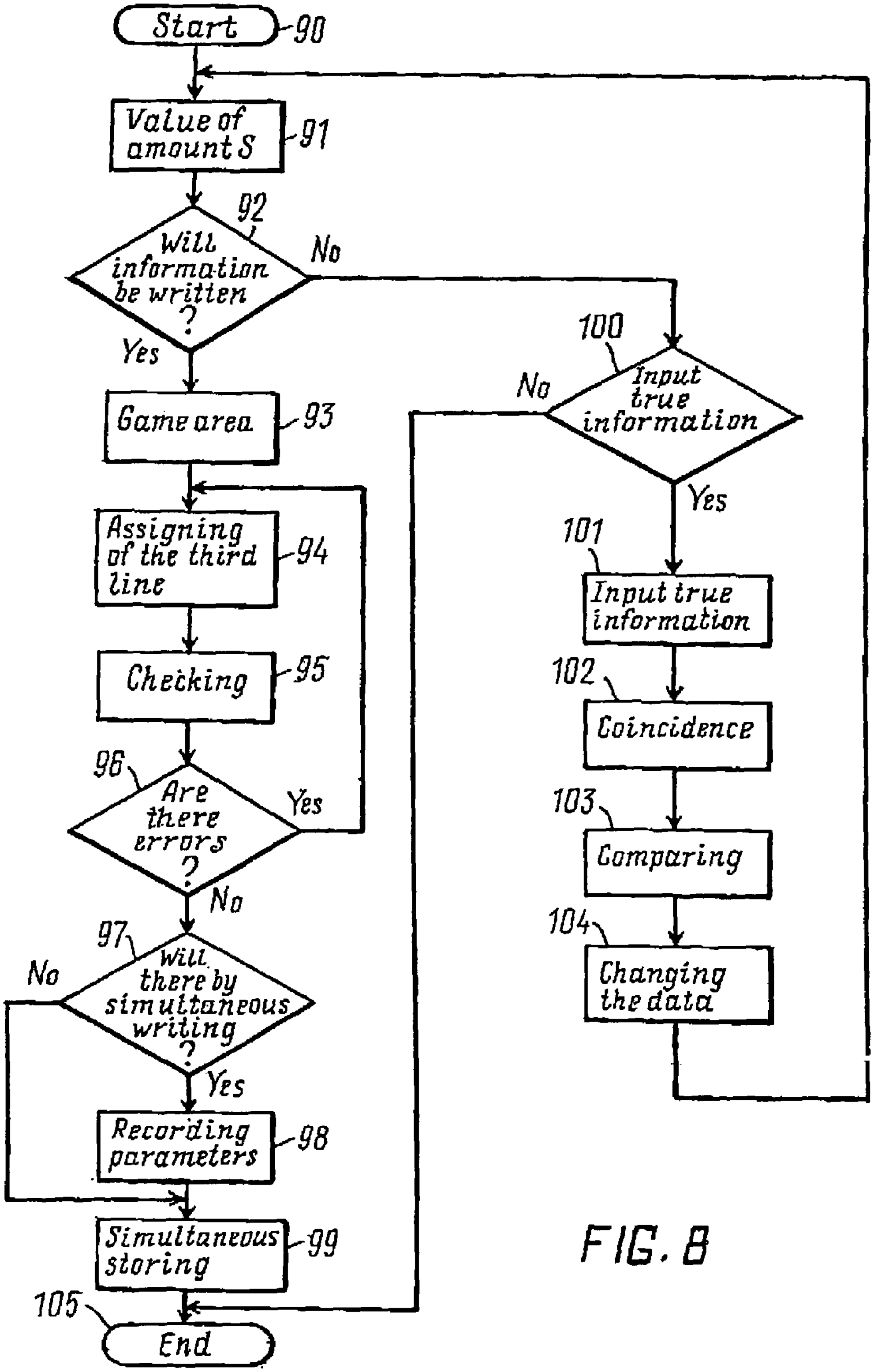
FIG. 8 illustrates a flow chart of an algorithm used to record an information into a portable memory device.

FIG. 8 shows a flow chart of the PorMD operation algorithm. Numerals that are not designated in said Fig. are as follows.

Item 91 denotes the step of Indication S;
item 92 indicates the condition of Will there be recording of information?;
item 93 denotes the step of Formation of the game area and indication of ticket number;
item 94 denotes the step of Preparation of information;
item 95 denotes the step of Checking of information;
item 96 indicates the condition of Are there any errors?;
item 97 indicates the condition of Will there be simultaneous recording?;
item 98 denotes the step Inputting of parameters of simultaneous recording of tickets;
item 99 denotes the step of Storing information and data of the timer;
item 100 indicates the condition of Will there be input of true information?;
item 101 denotes the step of Input of true information;
item 102 denotes the step of Input of processing rules;
item 103 denotes the step of Comparison of informations and analysis of this comparison;
item 104 denotes the step of Data change.

The system for holding lotteries and sport totaliser is operated according to the flow chart of algorithms shown in FIGS. 3, 4, 8 and based on the two following interrelated basic concepts characterised below. The first concept is based on that a hypothetical result of this or other event (the result a lottery, next move in a chess game, soccer match result) and also stakes, for example money stake, on its result can be recorded in PorMD memory. The second concept consists in that for checking that only the hypothetical information was recorded it will be sufficient to store automatically, during recording thereof, only the data N from timer 27 and its temporal characteristics P; and compute the recording time T(i), registered in CM 17, on their basis at data collection center 10 or terminal 12. Thus not only any dependency of a user on communication means, when an event is held, is excluded, but, as will demonstrated below, this circumstance will provide viewing of a sports event with a new quality level that will demand some intellectual efforts from the fans. Particular examples of participation of user 3 in some events using loter 4 are described in international application WO 97/20275 and also in Russian patent N 2080138. For this reason, only the system functioning process and principles for computing the time of recording of information in internal memory of PorMD will be further described; and practical realisation of said algorithms is carried out using a dedicated software that is stored, first, in a ROM in internal memory 26 of PorMD 4, and, second, in ROM's of means 13, 17, 21 comprised by this system.

After PorMD is initiated (step 35), user 3 must make decision on preliminary presentation of PorMD to data collection center 10 for reading and storing data N1 of the timer before the preliminary information will be recorded in POrMD memory. In case of the positive decision (Yes in condition 36) and refusal to determine the temporal characteristics of the timer (No in condition 37), value N1 is read (step 38), which value is stored in one of means 13, 17, 21, depending on the method of connection of PorMD. After determination of one, or more temporal parameters of a signal received at output of the timer (step 41), they can be stored in data collection center 10 (step 40) or in internal memory 26 (step 39).

Determination of the signal temporal parameters is carried out using means 14 for measuring temporal characteristics being a frequency meter or time interval meter. All these instruments are standard ones and have very small measurement error, which error in the fixed instruments that use, for example, the stroboscopic method can be reduced to values of the order of 10–12. After user 3 has done i-th recording of information in PorMD memory (hereinafter, instead of i-th recording of information in PorMD memory by user 3 phrase the i-th recording phrase will be used) (step 43), and after said user has done additional recordings (or deletion thereof) by value of j (j being an integer), PorMD is connected to terminal 12 or data collection center 10 for computing moment of time T(i) of i-th recording. If there is no win (<<No>> in step 45) after all event have been held, then computation T(i) is not performed, and participation of user 3 in further game is ended (step 56). Otherwise a method for computing T(i) must be selected.

In further description, time moments of i-th recording as computed by first, second and third methods will be designated as T1(*i*), T2(*i*), T3(*i*), respectively.

Computation (step 48) according to the first method (1 in condition 46) is executed after reading of the timer data N(i) (step 47), which data were recorded in PorMD memory at the moment of i-th recording, according to the following formula $$T1(i)=T1+[N(i)-N1]P1,$$

where T1 is data of time measuring means 16 as registered at data collection center 10 at the moment of appearance of N1; and P1 is a temporal parameter determined in an established time interval to before i-th recording. Temporal parameter P1 is computed after reading of a pre-determined (step 41) frequency f1 or average period t1 of data N rate in interval to according to the following formula $$P1=1/f1 \text{ or } P1=t1.$$

Computation of time T2(*i*) (step 52) according to the second method (<<2>> in condition 46) is executed after reading of data of timer N2 (step 51), which data are present at the moment of reading at output of PorMD, and reading of data N(i) (step 51) recorded in PorMD memory at the moment of i-th recording, according to the following formula $$T2(i)=T2-[N2-N(i)]P2,$$

where T2 are data of time measuring means 16 registered in data collection center 10 at the moment of appearance of N2; and P1 is a temporal parameter determined in an established time period t after i-th recording. Temporal parameter P2 is computed after determination of average frequency f2 or average period t2 of data N rate in interval t0, according to the following formula $$P2=1/f2, \text{ or } P2=t2.$$

Computation of T3(*i*) (step 55) according to the third method (3 in step 46) is executed after reading of timer data N2 (step 54), which data are present at the moment of reading at output of PorMD, and reading of data N(i) (step 54) that were recorded in PorMD memory at the moment of i-th recording, according to the following formulas $$T3(i)=T1+[N(i)-N1]P3,\ T3(i)=T2-[N2-N(i)1P3,$$

where P3 is a temporal parameter determined by the following formulas: P3=1/f3, or P2=t3. Average frequency f3 and average period t3 of data N rate in interval T2–T1 are determined as $$t3=(T1-T2)/(N1-N2),\ f3=(N1-N2)/(T1-T2).$$

It should be noted that measurement of temporal parameter G of a signal supplied directly from output of oscillator 33 can be also be used, and recalculation of P1, P2 in view of the circumstance that the one-to-one correspondence exists between these parameters: G=kP, where k is proportionality coefficient.

In conclusion of description of methods for computing T(i) it should be noted that each of data N1, N2, N3, N(i), P1, P2, P3 can mean not only single numeric values, but their certain set as defined, for example, by a peculiarity of operation of a timer. In this case, the above-cited formulas will describe operations performed with respect to a set of data.

The direct computation of T(i) according to the mentioned formulas is possible only in the case when after total error Y0(T, i) of measurement of T(i) is such that after PorMD is presented at location 10 or 12 during a predetermined maximum time interval T0 (i.e. T<T0), one of the following inequalities are satisfied:

$$T0(i)<t(i)-b,\ T0(i)<t1(i)-b,\ T0(i)<t2(i)-b,$$

where T0(*i*) is time of i-th recording calculated by taking into account its total (absolute) error Y0(T, i) according to the following formula $$T0(i)=T(i)+Y0(T,\ i).$$

Time moments t(i), t1(*i*), t2(*i*) can correspond, for example, either to the end of recording enable signal specially formed by former 19, or to signals that are present in true information source 1 (acoustic signal of referee whistle, when a referee raises hand for penalty, when the chess clock button is pressed, etc.). In cases when the presence of a win and degree of its value are determined according to swiftness of recording of information in PorMD, or when the time required therefor is limited to a small value being, for example within 0.1–1 s, then error Y0(T, i) is accommodated, for example, by its adding to value of T(i) (step 72). Error Y0(T, i), in turn, consists of the sum of two constituents: Y0(T, i)=Y0+Y(T, i). The first constituent Y0 is an absolute one and does not depend on time T and is determined by hardware errors (error of i-th recording due to discrete nature of data rate, error of determination of temporal characteristics in data collection center 10, etc.). The second constituent Y(T, i) is the main one, depends on time T and is determined as production of relative error Y and time T elapsed between i-th recording and reading of data from the timer, i.e. Y(T, i)=YT. Relative error Y characterises instability of operation of the loter timer and is determined, in particular, as ratio (or ratio module) (f–f0)/f0, or (f–f0)/f, where f0 is a known approximate value of frequency of the timer, and the accurate value thereof (measured by temporal characteristics measuring means 14) is f.

It follows from the foregoing that if a win is present, the loter must be presented as soon as possible so that its information would be read out.

Below follows description of 3 methods for determining constituent Y(T); thereat all reference numerals after Y denote the method number. All computations connected to realisation of the algorithm shown in FIG. 4 are performed at data collection center 10 using information processing means 21 (or in terminal 12 using information processing means 13); and after said means is initiated (step 57), auxiliary software and information previously obtained, for example from PorMD and needed for further computations, are read (step 58).

When the first method is used (1 in condition 59), a value of relative error Y1 is preset, which value can be separate for each of PorMD's and stored both in its memory and memory of information processing means 13, 21. Computation of error Y1(T, i) (step 61) is done according to formula Y(T, i)=Y1×T(i) after Y1 (step 61) has been read and T (i) computed.

When the second method is used (2 in condition 59), relative error Y2 is determined (step 65) on the basis of the temporal data arrived from the loter at the moment of reading of information therefrom, by determining (step 64) of their maximal difference during said reading, for example. In the course of determining the difference of temporal data of the timer, PorMD can be exposed to action of external factors (temperature, vibration, humidity, electromagnetic radiation, etc.) (step 63) created by external effects generating 15. As the latter, the following known means can be used: various thermal chambers, vibration benches, etc. In case of absence of external effects (No in condition 62), the maximal difference of temporal data is determined by taking into account the recent values Y2, P2 that can be stored both in the loter memory, and memory of means 13, 21. Computation of error Y2 (T, i) (step 66) is done according to formula Y2(T, i)=Y2×T(i).

The third method of computation of Y(T, i) is based on the concept that k reference recordings in loter memory (step 67) are made, time T(k) of which recordings is known and stored in data collection center 10; after recording time T(k) has been determined according to one, or more above-described methods and by comparison of these times, T0(*i*) is determined.

In other words, value of error Y3(T, i) for i-th recording is determined after comparing of times T(k) computed by relevant formulas and stored in data collection center 10. As a result of said comparison, probabilistic characteristics are computed (step 69) and, basing on analysis of comparisons (step 69) of said characteristics, Y3(T, i) is determined (step 70). Analysis of comparisons (step 69) can be performed by such probabilistic characteristics as dispersion, moments, semiinvariants, etc. Besides, accommodation of correlation coefficients r between these characteristics belonging to different points on the time axis is also possible. For the reason that for normal operation of a loter, random distribution in respect of deviation of its average meaning on the time axis of the computed values T(i) and T(k) must be proximate, then, knowing Y (T, k), Y (T, i) can be determined as well, and hence TO(i) too. And, vice versa, violation of probability rules of distribution of T(k) in vicinity of expectation of T(k) can serve as an evidence of an intended or occasional violation of the loter operation mode. In such event, in computing Y3(T, i), the difference between the probabilistic distribution parameters used in determination of T0(*i*) must be taken into account. It is obvious that as k recordings number grows, accuracy of determination (estimate) of error Y (T, i) increases. Furthermore, accuracy of estimation of said error is affected also by evenness of distribution of k recordings. When the number of the known points T (k) is small, it is reasonable to use a simple algorithm for computing Y3 (T, i) (step 70), which algorithm consists in determination of deviation (dispersion) (step 68) at point k from the known value T(k), and, if such deviations do not exceed a predetermined value (or values), then Y(T, i) is equated to one of the following values: a predetermined value multiplied by coefficient a (a>1); maximal deviation determined in the above-mentioned computation and multiplied by coefficient a (a>0). If a dispersion exceeds a predetermined value, coefficient a then must be greater than one (a>1). After computation of T0(*i*) has been completed (step 73), further processing of the information that has been read from the loter takes place.

It is noted that Y1(T, i), Y2(T, i), Y3(T, i) can be computed using also more sophisticated formulas having the non-linear nature with respect to time T. In this case a participant must present his/her loter for reading the same as soon as possible, for if this condition is not met, value of T0(*i*) may exceed the allowable value. The following advantages of this version of computing T0(*i*) can be mentioned: an higher security level for event organisers against attempts of artificial reducing of T(i) by way exerting a long-term action on a loter by various factors.

As was noted above, indefiniteness of location of the moment of time of i-th recording with respect to pulses of timer 27 data causes absolute error Y0, in particular its major portion, to appear. The error caused by this indefiniteness can be practically excluded using such timer 27 that at its output would have pulse of a greater frequency, for example 200 Hz. But in this case additional difficulties that relate to recording of temporal data in PorMD memory may evolve. Another way to reduce error Y0 is provided by using master oscillator 33 having an high pulse frequency and connected to controlled counters 34 implemented at the hardware or software levels; the number of said counters must be not less than the maximal possible number of recordings, and output data N(i) of each of the counters at the moment of reading information from PorMD must correspond only to one i-th recording. The concept of operation of a timer is in that: at the moment when information is recorded, then only turning-on of a relevant counter (not storing of its data) and its operation until the moment of reading of information from a loter take place; recording of an error in this case being determined by frequency of master oscillator 33, which frequency in such arrangement of the timer can be sufficiently high. The hard- and software of realisation of such arrangement is a standard one and based, for example, on comparing, in control unit 32, the counter codes and code of i-th number of information (for example, just a recording number that is stored together with the information can be used as the code of i-th number of information) prepared for recording in the loter memory; when code of i-th number of information coincides with that of a corresponding counter, its filling with pulses from master oscillator 33 begins. The filling instruction formed at control unit 32 is sent to the control input of a corresponding counter or to a key positioned at its input.

Of course, computation of T(i) according to the above-cited formulas is carried out after a series of current data have been read from timer 27, the number of which data will correspond to that of i-th recordings; value of each datum of N2(*i*) data corresponding only to one i-th recording. As an example, the formula for computing T2(*i*) according to the second method is cited:

$$T2(i)=T2-[N2(i)-N(i)]P2,$$

where N2($i$), N(i) are the data that relate to one counter at the moment when information is read and recorded. It is noted that a constant number of N(i) recorded in each of the counters beforehand and from which pulse counting begins can be used as the counter code.

Below follows description of operation of separate devices comprised by the described system. As was noted in the first part of the specification, the absence of a true information source in the form of an automatic lototron can be mentioned among disadvantages of the known systems. FIG. 5 shows a general view of such lototron whose operation principle is based on selection of the winning balls without taking them out of a rotary drum. Before a lottery is drawn, number of its drawing is shown on indicator 81. This indicator further shows information concerning permission (or prohibition) of participation in the lottery by way of recording, in PorMD memory, numbers of the balls to be selected by the lototron after they have been mixed. If balls 75 are marked not by numerals but by other signs (colour, symbols, etc.), then the appropriate signs must be recorded in PorMD memory. Before the procedure of selecting the winning balls, they are mixed by rotation of drum 74 using drive 80. For better mixing of the balls, direction of drum 74 rotation must be changed regularly. During mixing of balls 75, guide 76 must be in a position at which it, first, does not hinder the mixing process and, second, does not hold the balls in case they fall on its surface. Of course, the optimal position will be such whereat stopper 82 is disposed above guide 76. This position of the guide is shown in FIG. 5 by dashed line. Duration of the ball mixing period is determined beforehand or is a random value produced each time before every drawing by information processing means 21, for example. Said means also outputs the information about current drawing number and permission for user 3 to make recording, of the ball numbers in loter 4 memory that can be selected by lototron.

Selection of the winning balls is done after guide 76 is rendered into a position whereat, first, fall of the balls on its surface when the drum is rotated counter-clockwise is ensured, and, second, their rolling down over the guide surface towards the center of drum 74 is provided. Balls are kept on the surface of guide 75 by stopper 82. In the ball selection mode, drum 74 rotates counter-clockwise until the surface of guide 76 gets a predetermined number of balls 75, which number can be known beforehand or determined at data collection center 10 in accordance with the rules announced previously.

For more reliable selection of the balls, rotation of drum 74, after its transition to said mode, must be implemented at a low angular velocity. Information about the number of balls and their signs (number, colour, etc.) appears at the data collection center using sensor 18, and a portable telecamera connected to a device for identification of number of the balls and their signs can be suitably used as such sensor. Balls on the surface of guide 76 after the drum is stopped are still kept for a while, and after that the lototron returns automatically into the ball-mixing mode by rotation of drum 74. Transition to said mode is done after the balls have been released from guide 76 owing to its automatic return to the initial position. An advantage of this system, wherein true information source 1 is the described lototron, is in that said system is completely autonomous, simple and rather viewable.

Below are given particular examples of distinguishing features relating to inputting of information into PorMD and also its functioning in terms of processing; the relevant algorithm being illustrated in FIG. 8. According to this Fig., step 90 denotes turning-on of PorMD, and step 105 denotes its turning-off. After PorMD is turned on, panel 84 indicates value of amount S (step 91) stored in the non-volatile portion of memory 26, as well as another information announcing that the loter is ready for functioning. Units of value S can be expressed both in particular money units, and in their, relative values (points, scores). Before recording of the hypothetical information (Yes in condition 92) in the universal loter, whose face panel 83 exterior is shown in FIG. 6, selection of a game area, i.e. selection of number and set-up of sign locations on panel 84 corresponding to this event, is carried out. For the purpose to reduce the number of keys, a required game area in a universal loter is selected by pressing one of the keys intended for entering digits from 0 to 9; each of the keys having its corresponding game area. Thus, when key 1 is pressed, there appears a game area (step 93) designed for participation in 5 from 36 lottery, in which 5 digits among 36 digits are to be predicted:

01/40 Cod: 0000
00.00.00.00.00
s=0000 S=135.25;

and also appears a cursor being a small flashing triangle positioned in the location where a symbol to be entered from the keyboard will be imaged; until the moment of storing a ticket, any corrections of the already entered symbols are possible, for example by directing the cursor by keys bearing arrows of the upward, downward, left and right directions to the place of a symbol to be corrected and by pressing a required key. In this case number S shows that the amount recorded in the loter memory is $135.25.

In further description, the whole information required for participation in an event will be denominated as ticket, the first two digit orders in the first line define its number, and the second two digit orders, separated from the first one by / sign, denote the maximal number of tickets that can be recorded in PorMD memory.

In this case, for participation in 5 from 36 lottery, the lottery code must be formed, for which code four last sign locations in the first line, five digits from 1 to 36 in the second line are reserved, and money stake s, for which four digit orders in the third line (step 94) are assigned, is determined also.

One of the advantages of formation of predetermined game areas is simplicity of checking (step 95) in the loter electronic circuitry upon correctness of their filling by the hypothetical information, for example. Thus, in the considered case, a ticket will not be recorded in the memory after pressing of M memory recording key (Yes in condition 96), if in formation thereof similar numbers or those over 36 are selected.

The other possible variants of the second line in a ticket (in parentheses one of the possible kinds of sports and sign location decoding are given) occurring when other entry keys are pressed, are as follows: 00/000 (races; heat number/heat winner number), 00/000.000 (running; running number/winner number/number of the runner being second to reach finish), 00/YES (basketball; penalty throw number/falling of the ball into basket), 00/NO (basketball; penalty throw number/the ball misses the basket), 00/0.00 (figure skating; performance number/performance estimation), 00/0:00.00 (chess; move number/piece code:number of the field.number of the field); 00/00.00:00 (soccer; match number/first time scores.second time scores).

As was noted heretofore, one of disadvantages of the known PorMD's is the impossibility of participation of users 3 in the lotteries, wherein the cards having the already filled-in data set (Bingo and Russian Lotto lotteries) are used. FIG. 7 shows a general view of a version of specialised PorMD intended for participation in Russian Lotto lottery. The essence of the concept is in that the whole panel (or a portion thereof) 87 of indicator 31 has the form of a relevant lottery card, in this case—card 89 of Russian Lotto lottery. In this case, not only the digits value but also their locations on panel 87 are stored. Formation of digits and their positions must satisfy the applicable rules for filling the lottery card; and at the moment when said set of data is stored, data of timer 27 are also stored.

It can be noted that game area of specialised loters can be created for other events as well, for example for roulette game. In this case, the stake amount must be entered before drawing, and its kind must be indicated on the loter game area, for example For three numbers, including Zero, or For two transverse rows. When there is no error in a formed ticket (No in condition 96) and if a user refuses to make the simultaneous recording in a plurality of tickets (No in condition 97), the ticket data and those of timer 27 are stored simultaneously after pressing of key M (step 99). When several tickets are recorded simultaneously (Yes in condition 97), parameters of such recording must be entered (the number of simultaneously recorded tickets, number of hypothetical information versions, a method of formation of the hypothetical information, etc.) (step 98).

Among said parameters the important one is a method of formation of the hypothetical information. If the hypothetical information has the random nature, then such parameters used for forming other tickets as the random rule type; values of coefficients in a selected random rule, etc. can be preset. If the hypothetical information can be forecast in a way, then a given lottery can provide for entry of the values that influence the formation of the tickets intended for recording, in particular for simultaneous recording of several tickets.

For prediction of results of a sports event, for example a soccer play, the loter software is adapted to analyse the number previous matches, ratio of victories and defeats, a level of fitness of an opponent. All these data, in relative units, must be entered into a loter.

The second method is based on the circumstance that a plurality of occasional factors correspond the main soccer event—goal. For the internal, in particular an additional microprocessor of a loter, a software has been prepared on the basis of the game theory. This software presumably concentrates the entire intuition of a fan, his knowledge of soccer, experience—the whole soccer ken. For running the software, values of appropriate symbols S(i) must be entered, the symbols being defined, e.g. by digits from 0 to 10, i being the symbol number. Further processing is to be done according to an algorithm selected therefor; one of such algorithm can have the following underlying procedure. After all symbols have been defined, they are summed and then an interval whereto the so obtained number would fall is determined. Such intervals are three: defeat—from 0 to 35, draw—from 36 to 68, <<victory>>—from 69 to 90. For example, to the first symbol—home field or that of an opponent—digit, say, 3 must correspond (generally greater than 5) when the match will be held on the opponent's field; or 8 (generally greater than 5) in case the match will be held on the home field. The match to be held on a neutral field will be designated by digit 5. Another symbol—result of recent matches—shows how successful were last five matches for a given team. In case the team won 10 points, then it will have the highest estimate—10. In case the opponent team's matches were successful (10 points after 5 matches), this column will be filled with 0. In the tournament situation column user 3 will write the digits that take into account the matches of teams of his interest held on the field where they had to play. Then—team composition symbol. Many factors are taken into account in this symbol: coming of new strong players, illness of the leading soccer players, absence of the leaders taken to a national team, change of a trainer, etc. Other symbols take into account the fact that two given teams now meet, the weather conditions in terms of a benefit for a given team.

Thus after (automatic or manual) entry of appropriate symbols SW into loter by user 3 and after the loter has been rendered into the mode of automatic formation of tickets and the mode of their simultaneous recording, such variants of the soccer match results that probably will be proximate to the real outcome, can be recorded easily. If after turning-on of the loter, the data stored therein are checked (Yes in condition 100) upon a degree of their coincidence with the true information, then after pressing of key R (R is the key for entering the true information) said information is inputted into the loter (step 101) by a method selected therefor. Manual inputting of the true information is done by entry keys, automatic inputting is done by receiving and decoding of a relevant signal using transmitter 22, decoder 23 and controller 24. Visual monitoring of inputting of the true information is implemented by pressing key i (i is the key to render indicator 31 into the mode of displaying the information that is required when one of <<S>>, <<A>> or <<R>> S, A or R keys is pressed).

In case of necessity of inputting of the rules for comparing informations so that to determine a degree of their coincidence (step 102), the following steps are carried out: first, key A (A is the key to input the rules for information comparison) is pressed, and, second, formation of said rules by pressing the relevant keys of PorMD takes place. It will be appreciated that special keys S, i, A, R are optional. In such case initiation of the special functions, when they are present in PorMD, are performed by a keyboard that provides for the combined function mode, which mode allows to use each of the keys for performing two and even three steps relating, for example, to entry of symbols S(i).

When the rules are entered automatically, receiver 22 is used. In another embodiment of a loter, all ancillary information (processing rules, information about an event proper or about the persons participating there, number of the hypothetical information variants, a method of formation of the hypothetical information) can be entered via one of information input/output devices 29 that is implemented, for example, in the form of means for reading information from the known carriers, for example from narrow magnetic cards that can be kept separately and then inputted into the loter. A similar information input device is used in pocket calculator HP-65 manufactured by Hewlett-Packard.

The result of the comparison operation (step 103) carried out in the loter electronic circuitry may cause different actions upon its data or cause a change therein (step 104). Thus, for example, when the win numbers, inputted in the loter (FIG. 7), coincide completely with digits in any horizontal row of any ticket recorded in the loter memory prior to the recording ban moment as determined by the lottery organisers, said line can start flashing.

Besides, another information can also be indicated, i.e. total amount and numbers of the winning tickets; total number of horizontal lines, whose number completely coincided with the winning numbers; amount of the total win; total number of horizontal lines whose four numbers have coincided with the winning numbers, etc. A change in the data can be accompanied by such actions as: appearance of a new question on indicator 31 (this action is possible in case when various quizzes are held, or during a lesson or lecture in a school or university); recording of a money amount in the loter after the loter has received an encoded signal; the time of transmission of such signal and value of the money amount being stored at data collection center (10, 12); and at the moment when said amount is recorded in memory (26), the timer (27) data are stored. Storing of the amount and the time when the same is transferred to the loter memory at the data collection center allows to confirm its recording after the loter has been presented and the time of recording of said amount according to the loter's timer computed.

It will be appreciated that such procedure for recording of a money amount in the loter memory allows use to that end an encoded signal transmitted via the mentioned communication channels, or use special cash registers therefor.

Another service functions, with which the loter could be provided, can be mentioned as well: manual (after C key is pressed) or automatic deletion of the loser tickets in the memory; indication and storing of the lost amount; recording of information from the loter memory on a magnetic card, etc. In conclusion, it should be noted that formation of game areas (step 93) can be done automatically by selecting a code, thereby the game area pattern will be determined by its number (a portion thereof). A rule for forming a game area by a code number is defined beforehand by a manufacturer or by a player himself by preliminary tuning of a loter. In the first case an international (or at least national) system of codes (International Standard Lottery and Totalizator Numeration, ISLTN) intended for game or educational events must be established.

An advantage of the claimed system is that any dependency of its participants on communication means and any individual tuning of the loter internal timer to the time measuring means standard frequencies is obviated, which circumstance makes a loter less expensive to a considerable extent and also improves accuracy and reliability of determination of the moment when the hypothetical information is recorded. The following advantages can be identified with the additional advantages of the considered method for time computation: exclusion of such destabilising factor as long-term frequency drifts of the loter quartz resonator, and the possibility to use quartz resonators therein without selection of their frequency. Application of this system provides the process of viewing a sports event with a novel quality level, first of all for the reason that a fan participating in a totaliser becomes not a passive observer of an event, but, in a sense, a participant thereof, for now he/she has an opportunity, basing on his/her understanding of a given kind of sports, to guess actions of the sportsmen and athletes (moves in a chess play, result of penalty throw in basketball, eleven-meter penalty in soccer, knockout result in boxing match before a referee counts ten, etc.) directly in the course of a given sports event proper, and also to guess points to be given by referees, umpires (points given by referees in figure skating, gymnastics, boxing, etc.).

Another advantage of the invention is its unlimited possibilities and means wherewith many hundreds millions viewers may be additionally attracted to TV screens, receivers, computers connected to telecommunication networks, and also to stadiums and playgrounds.

Apart from the above-mentioned merits, the invention has a series of advantages in terms of a very significant saving of paper, ink, and also means required to produce various coupons, cards and other similar slips used for holding lotteries and totalisers. This circumstance constitutes a benefit for environment and saves the funds spent for processing of said forms.

Among other advantages the following ones can be mentioned: a user may leave any event before it is completed, the possibility to set up a totaliser between two or more users (if at least one of them has a PC that performs the functions of terminal or server 12); minimal expenses for means that process the hypothetical information, complete exclusion of a possibility to forge the information recorded in the loter memory. The cause of a low level of the funds required for processing of the hypothetical information is its small volume, for in case the hypothetical information and true information do not coincide, a user does not present his loter to a data collection center. An important additional advantage (the main advantage is the possibility to participate in Bingo-type lotteries) of the method for forming a game area considered in the invention and conforming with a given event is in that the formal aspect of the ticket filling is preserved. This circumstance decreases the: probability that a user would make any claims against organisers of an event, and provides a considerable convenience for formation of a ticket, because the number of errors connected with filling thereof is reduced considerably. Thus, the disclosed invention opens a new era in relationships between the mass media and people transforming the latter from passive viewers of an event into its active participants.

The invention can be suitably used in events connected with holding of various lotteries and sport totalisers. The invention can be used for popularisation of chess, because practically any person having PorMD is able to participate in a chess totaliser or tournament. The invention can be used by advertising agencies to attract viewers to repeated advertisements, because every time an advertisement is demonstrated, most simple questions about the advertised products, that require immediate answers, could be asked. The invention can be suitably used for mass production of PorMD's in the industries that manufacture integrated circuits by complementary MOS technology.

The invention claimed is:

1. A method for playing a lottery game, comprising:

providing a computer connected to a precision timer;

providing a portable memory device to a lottery game participant, said portable memory device being connectable to the computer, the portable memory device including at least a microprocessor, and a timer unit, a memory, and an input-output device, each interconnected with the microprocessor;

providing a time characteristics measuring device connectable to the timer unit of the portable memory device;

connecting the portable memory device to the computer;

by means of the time characteristics measuring device, measuring at least one of a frequency f and a period t of data N outputted from the timer unit, and recording a data of the measured frequency f or period t into the computer, wherein N is a number;

by means of the computer, reading off and storing data T1 outputted from the precision timer, wherein T1 is a time value;

by means of the computer, reading off and storing data N1 outputted from the timer unit at a moment when the data T1 are outputted from the precision timer, wherein N1 is a number;

disconnecting the portable memory device from the computer;

providing the lottery game participant with access to the at least one portable memory device and allowing the lottery game participant to play the lottery game, during which true information regarding the lottery game and a corresponding time are registered;

by means of the input-output device, receiving an i-th proposed information associated with the lottery game, which is inputted by the lottery game participant, and by means of the microprocessor, recording the i-th proposed information together with corresponding data N(i) into the memory, wherein i is an integer, N(i) is a number, and the data N(i) are outputted from the timer unit when the i-th proposed information is entered;

reconnecting the portable memory device to the computer and reading off the recorded i-th proposed information and corresponding data N(i);

comparing the i-th proposed information with the true information, and if a result of the comparing is within a required coincidence level, calculating in the computer a time T(i) of recording the i-th information by a formula: $T(i)=T1+[N(i)-N1]*P$, wherein $P=1/f$ or $P=t$; and determining a prize for the lottery game participant based on the calculated time T(i).

2. The method according to claim 1, further comprising:

storing, in the computer, a relative error Y of the frequency f of data N outputted from the timer unit, wherein Y is a number;

determining a time T between recording of the i-th proposed information into the portable memory device and the reading off of the data N(i) by the computer; and increasing the time T(i) by a product Y*T.

3. The method according to claim 1, wherein the step of reconnecting the portable memory device to the computer further comprises:

reading off and storing data T2 outputted from the precision timer and data N2 outputted from the timer unit at a moment when the data T2 are outputted from the precision timer, wherein T2 is a time value and N2 is a number; and calculating the time T(i) by a formula: $T(i)=T2-[N2-N(i)]*P$.

4. The method according to claim 3, wherein the parameter P is calculated by a formula: $P=(T1-T2)/(N1-N2)$.

* * * * *